US008328605B2

(12) United States Patent
McMurray et al.

(10) Patent No.: US 8,328,605 B2
(45) Date of Patent: Dec. 11, 2012

(54) PASSIVE SYSTEMS AND METHODS FOR SHACKLING PRODUCTS

(75) Inventors: Gary V. McMurray, Atlanta, GA (US); Jonathan Frank Holmes, Atlanta, GA (US); Wiley Holcombe, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/788,172

(22) Filed: May 26, 2010

(65) Prior Publication Data

US 2011/0136422 A1    Jun. 9, 2011

Related U.S. Application Data

(60) Provisional application No. 61/181,074, filed on May 26, 2009.

(51) Int. Cl.
*A22B 7/00* (2006.01)
(52) U.S. Cl. ..................................................... 452/182
(58) Field of Classification Search .............. 452/149, 452/166, 169, 170, 151, 155
See application file for complete search history.

(56) References Cited

U.S. PATENT DOCUMENTS

| | | | |
|---|---|---|---|
| 5,115,903 A | 5/1992 | Leander | |
| 5,672,100 A | 9/1997 | Nielsen et al. | |
| 6,135,872 A * | 10/2000 | Freeland et al. | 452/66 |
| 6,623,346 B2 | 9/2003 | Lee | |
| 6,623,348 B1 | 9/2003 | O'Neill | |
| 6,958,008 B2 | 10/2005 | Seesing | |
| 7,097,552 B2 * | 8/2006 | Ovesen et al. | 452/66 |
| 7,134,956 B2 * | 11/2006 | Lee | 452/53 |
| 7,341,505 B1 * | 3/2008 | Gasbarro | 452/169 |
| 7,364,504 B2 * | 4/2008 | Gasbarro | 452/156 |
| 7,377,843 B2 * | 5/2008 | Koops | 452/58 |
| 7,506,748 B2 * | 3/2009 | Pugh et al. | 198/529 |
| 7,662,032 B1 * | 2/2010 | Gasbarro | 452/155 |
| 7,717,773 B2 * | 5/2010 | Woodford et al. | 452/66 |
| 7,794,311 B2 * | 9/2010 | Groenewegen et al. | 452/173 |
| 2004/0147213 A1 | 7/2004 | Kerstholt | |
| 2008/0242208 A1 | 10/2008 | van den Nieuwelaar et al. | |

* cited by examiner

*Primary Examiner* — Richard Price, Jr.
(74) *Attorney, Agent, or Firm* — Jenkins A. R. Jenkins, Esq.; Troutman Sanders LLP

(57) ABSTRACT

A passive system, apparatus, and method for transferring poultry products exiting the chiller to a cone or shackle line.

16 Claims, 9 Drawing Sheets

PASSIVE SYSTEMS AND METHODS FOR SHACKLING PRODUCTS

CROSS REFERENCE TO RELATED APPLICATION

This application claims benefit under 35 USC §119(e) of U.S. Provisional Patent Application Ser. No. 61/181,074 filed 26 May 2009, which application is hereby incorporated fully by reference.

BACKGROUND OF THE INVENTION

1. Field of the Invention

The present invention is directed towards systems, apparatus, and methods for moving singulated products of random configuration to a final destination. More particularly, the present invention is directed towards a passive system, apparatus, and method for transferring poultry products exiting the chiller to a cone or shackle line.

2. Description of the Related Art

Food processing is one of Georgia's leading industrial sectors, and one of the largest industrial employers in Georgia. The industry and the agriculture are a big part of the Georgia economy (the leading producer of chicken in the United States). Georgia is the third largest poultry producer in the world. Poultry processing is highly mechanized, and produces 24.6 million pounds of chicken every day.

In the majority of poultry plants, a water chiller is used to cool birds immediately after slaughtering, evisceration, and defeathering. Upon exiting the chiller, the birds are manually rehung onto shackles. It can take from two-to-six individuals on the line to rehang the birds in order to meet production requirements.

The poultry industry is interested in reducing manual labor for many reasons, not the least of which is safety concerns for both the worker and the consuming public. There are many health-related issues associated with continuous repetitive motions, like those necessary in the rehanging process.

To produce the millions of pounds of poultry, mechanization has been introduced into processing plants, but various steps are not yet automated. In those areas, manual labor is used, and in many instances workers are called upon to work long hours, and use the same movement their entire shift. The relatively difficult working conditions of poultry processing plants are not the only problems for laborers. There are physical and psychological impacts too. Performing the same movement all day with a sustained rhythm is not healthy. It can create a lot of problems on the articulations, and on the musculature. Particular to the shackling process, rehanging work is repetitive.

Robots have been used in systems that require repetitive processes, as they can be designed to perform such repetitive steps continuously, almost without fail, with extreme precision and at high speed. However, robots have not yet been fully adapted for handling non-rigid materials, such a birds. There is current research into end-effectors able to effectively handle birds, and robots with such end-effectors have been tested in static cases (the bird and the shackle are not moving). Others have worked with the theory of how robots would operate in dynamic situations (handling moving birds and hanging them on a moving shackle line), but implementation of such a working system, beyond just theory, in a poultry plant has not occurred. It is generally assumed robotic substitution in this part of the poultry process will not work, as it has been shown that the robotic manipulation of shackling can take from six to seven seconds to process a single bird, making it three to four times slower than the human process of moving a bird from a conveyor to a shackle line.

Therefore, today's poultry companies are not looking to robotic systems as potential solutions for shackle loading systems, as they are shown to be too complicated a solution for this industry, and perhaps even ultimately unsuccessful. Thus, a need exists for flexible and economically priced systems, apparatus, and methods to move singulated poultry products of unknown position and orientation from a moving conveyor belt to a cone or shackle line. The present invention is directed to a simpler, passive system to handle this need.

BRIEF SUMMARY OF THE INVENTION

The present invention mainly comprises three subsystems in the poultry process. A first preferred subsystem comprises a configuration subsystem, to repeatedly and consistently configure an item with an initial configuration that can vary widely from item to item, into the same, single final configuration. While an item can be presented to the configuration subsystem in nearly an infinite number of initial configurations, the present configuration subsystem manipulates the item into a single configuration in order to simplify the downstream processing so it can occur on items that have been configured into the same, single configuration.

In a preferred embodiment, the first subsystem manipulates randomly supplied birds—each potentially in a different initial configuration—into the same, single final configuration, most preferredly, into a breast-up position, feet first orientation. This, of course, simplifies the downstream processing of the birds, as the birds are configured into generally a single appearance, and thus simplified downstream subsystems to handle the birds can be used.

A second preferred subsystem comprises a specifically designed transfer box used to consistently deliver differently sized, shaped, textured and weighted items (in the same configuration) to a process line. In a preferred embodiment, the second subsystem comprises a transfer box capable of presenting birds in the breast-up position from the configuration subsystem to a shackle line. The transfer box preferably is specifically designed from FDA approved materials and meets USDA/FDA design guidelines. The transfer box can also be designed with holes in it to allow water to flow through the box to chill the bird in a chiller.

A third preferred subsystem comprises a transfer process enabling an item in a transfer box moving at one vector, to smoothly transfer to a process line moving in a different vector. In a preferred embodiment, the third subsystem comprises a transfer process enabling a bird held in a transfer box to be hung onto a shackle line, the path of the transfer box and the path of the shackle line interacting at the point of bird transfer.

An exemplary embodiment of the poultry processing system comprises supplying poultry products exiting a chiller, a first manipulating step to manipulate the poultry products into one of four configurations selected from a group consisting of a first configuration, a second configuration, a third configuration and a fourth configuration, a second manipulating step to manipulate the poultry products from the one of four configurations, into uniformly configured poultry products of a single of the four configurations, transferring the uniformly configured poultry products into a transfer box moving along a transfer box process path, and transferring the poultry product from the transfer box to a processing line moving along a processing line path.

Preferredly a chute from the chiller first manipulates the poultry products into one of the four configurations being breast-up, legs first; breast-up, legs last; breast-down, legs first; and breast-down, legs last.

The step of second manipulating the poultry products from the one of four configurations can comprise a machine vision system to capture images of the poultry products to identify which one of the four configurations each of the poultry products are in, an orientation system to rotate, if necessary, each poultry product to the correct orientation of the uniformly configured poultry product, and a position system to flip, if necessary, each poultry product to the correct position of the uniformly configured poultry product.

The transfer box can comprise an inclined base, upwardly extending side walls and a first end wall and an upwardly extending second end wall, wherein the second end wall is provided with two apertures and a separation obstacle therebetween, the inclined base inclined downwardly toward the second end wall, wherein upon receiving a poultry product to transfer, the poultry product is gravity fed toward the second end wall, wherein a leg of the poultry product extends through an aperture.

Various exemplary embodiments of the present invention are directed towards cost-effective automated systems, apparatus, and methods integrating commercial singulation machines with intelligent hardware to rehang birds onto shackles or cones after the chiller. Thus, in preferred embodiments, the present invention can manipulate poultry brought to it in a random assortment of configurations, and output generally uniformly configured poultry products, so they can relatively easily be hung onto a shackle line. The poultry products are delivered to the shackle line in a transfer box that presents variously sized, shaped, textured and weighted birds in a consistent manner so that no matter the physical differences between individual birds, each is consistently hung on the shackle line. The transfer box and shackle line utilize the transfer process to provide a consistent handoff of the birds from the transfer boxes to the shackles.

As used herein, while the term configuration generally includes nearly any three-dimensional environment an item, namely a poultry product, can have, the present invention simplifies the infinite possibilities using the term configuration as comprising a bird's position and orientation. The term "position" is used herein to define one of two possible states of the bird, breast-up and breast-down. The term "orientation" is used herein to define the rotational state of the bird in either position. Thus, for example, a bird can be in a configuration comprising the breast-up position, and a feet first orientation.

The present invention generally is located between the chiller and the shackle line, in order to automate what is now a manual process: the shackling of the birds upon exit of the chiller. As the birds exit the chiller, they fall onto a circular conveyor. At this location, the birds can be in one of two positions (although it will be understood by those of skill in the art, that a bird may not be in one of the breast-up or breast-down positions, but may be on its side or otherwise in another state, but for purposes of this description, this possibility is not further discussed), and can be in any of the 360 degrees of orientation. Thus, the birds can be either in a breast-up position, or in a breast-down positions, and in a number of orientations.

The present invention includes four top level processes: align the birds after the chiller, change (if necessary) the configuration of the birds into a single output configuration (by changing (if necessary) one or both of the position and orientation of the bird), place the birds into a transfer box, and then perform a transfer process to hang the birds. In a preferred embodiment, the present invention presents birds in the transfer box in a breast-up position, feet first orientation so the feet extend from the transfer box, ready for interaction with the shackle, and the transfer process presents the birds to the shackle line in a, breast-up position, in order to then hang the birds.

In a preferred embodiment, a processing system handling 180 carcasses per minute provides birds to a water chiller. The carcasses are ejected from the chiller(s) onto a chute. Carcasses slide down the chute into a hopper that feeds one or more singulators. Carcasses depart singulators spaced in a single-file line on three conveyor belts, one for each of three rotate-and-flip mechanisms.

Carcasses then fall off a conveyor belt, one at a time, onto another chute or funnel. Carcasses slide down the chute, and onto a rotating device.

A machine vision system captures an image of each carcass on the rotating device. The image is analyzed, and the machine vision system returns a two-bit classification indicating whether the carcass is breast-up or down, and legs first or last.

The rotating device then rotates to feet first orientation. In a preferred embodiment, the rotating device rotates either clockwise or counter-clockwise, depending on which direction of rotation provides the shortest path to the desired orientation.

The rotating device can have an anti-movement system to prevent the carcasses from spinning or flipping or coming off of the rotating device when the rotating device rotates. In a preferred embodiment, this anti-movement system is a "V" shaped floor of the rotating device, designed to receive carcasses.

A pusher then pushes the carcass into a flipping device. The flipping device flips the carcass, if necessary, into the breast-up orientation. Bomb-bay doors then open to drop the carcass into a transfer box.

The transfer box is ejected onto a conveyor upon receiving a carcass. The transfer box prevents the chicken from being randomly located on the conveyors. Additionally, the transfer box may contain holes to allow water to pass through the box in order to chill the carcasses.

The transfer box arrives at an input queue of an input system. The transfer box then moves from the input system to a synchronous conveyor. The transfer box then moves from the synchronous conveyor to a transfer conveyor to begin the transfer process. The synchronous conveyor can include a spacing system designed to ensure that the boxes are properly spaced while on the synchronous conveyor, thus facilitating transfer to the transfer conveyor. In a preferred embodiment, the spacing system is a system of grooves, attached to the synchronous conveyor, which receive the boxes. The transfer box can include a counter-balance system to keep the transfer box level even as it goes around corners in the transfer process. The triangularly shaped transfer path of the transfer box (in a preferred embodiment) is designed to not only remove the transfer boxes from the synchronous conveyor, but also return them to the same conveyor once the transfer box is empty (the bird is shackled).

The carcass is then transferred from the transfer box on the transfer conveyor to a shackle of a shackle line. The transfer box and shackle are synchronized in the horizontal direction, the shackle pushed out to engage the hocks of the carcass, and then the transfer box moves down resulting in the carcass hanging on the shackle of the shackle line. It will be understood by those of skill in the art that while in this embodiment, the transfer box is described as moving up and down (vertically) relative to a horizontal shackle line, it is the relative movement that matters. That is, the shackle line can move in a vertical direction, and the transfer box can move along a horizontal path, and/or both lines can move in directions that have both vertical and horizontal components. Additionally, the shackle line and the transfer box can move in the same direction, and then diverge, in order to engage the bird and remove it from the transfer box. Further, the transfer box can be held stationary, while the shackle line moves to engage the legs within the shackle, and remove the bird. The importance is that the shackle and hocks of the bird have a smooth transfer point to engage the bird, and then remove it from the transfer box, while the transfer box and shackle line continue to move away from one another so the shackle line can move the birds to the next steps in the poultry process, and the transfer boxes can be cycled once again to have a bird placed within them and moved to the shackle line.

After the bird is removed from the transfer box, the transfer box is ejected from the transfer conveyor carrier onto a chute and returned via a conveyor system. The transfer conveyor carrier folds down to avoid interference with the synchronous conveyor. The transfer box can now be cycled for use with another bird.

The present invention can also be used with cone loading. Cone loading occurs just after the bird is cut in half, and the front halves are singulated. The front-half birds are moved on a conveyor belt and handed out on several slides by a system of doors. The front-half product, like the birds, falls on a conveyor, at which time they can be in one of the two positions, and in any orientation. At present, the front-half birds are manually grasped by an operator, who hangs the birds on the moving cone.

Other aspects and features of embodiments of the present invention will become apparent to those of ordinary skill in the art, upon reviewing the following detailed description in conjunction with the accompanying figures.

BRIEF DESCRIPTION OF THE FIGURES

The various embodiments of the invention can be better understood with reference to the following drawings. The components in the drawings are not necessarily to scale, emphasis instead being placed upon clearly illustrating the principles of the various embodiments of the present invention. In the drawings, like reference numerals designate corresponding parts throughout the several views.

DETAILED DESCRIPTION OF PREFERRED EMBODIMENTS

Figure 1:
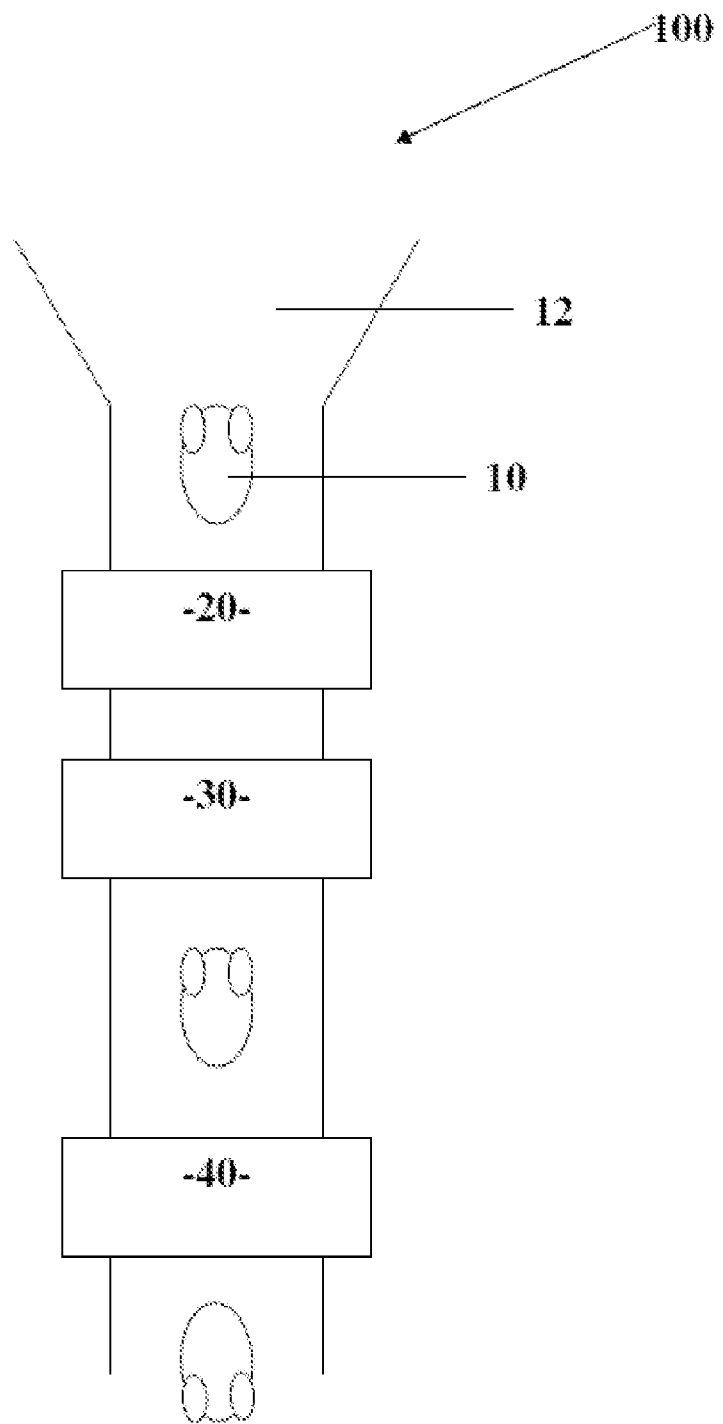
FIG. 1 illustrates a schematic view of the present configuration subsystem according to a preferred embodiment of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The various embodiments of the present invention are directed to passive systems, apparatus, and methods for transferring poultry products exiting the chiller to a cone or shackle line. FIG. 1 illustrates an exemplary embodiment of the configuration subsystem 100 of the present invention. The birds 10 have been ejected from the chiller (not shown) and onto a chute or funnel 12.

The chute is designed to limit the unlimited configurations the poultry product might have exiting the chiller to one of but four configurations. Preferably, the chute can manipulate the bird into one of two positions (breast-up or breast-down), and one of two orientations (feet first or feet last), and thus one of four configurations. The chute has an entrance that accepts all configurations of the bird, and a guide along its length to gently manipulate the bird into one of the four configurations, without having the bird become stuck in the chute.

The chute can incorporate vibration and lubrication systems to better present birds upon exit into one of the four preferred configurations. Vibration, if used at all, need not occur over the entire length of the chute. Lubrication, if used at all, can be continuous, or discretely used on a periodic number of birds (not all). Preferred lubrication is water or another substance that is not harmful in the poultry process.

A machine vision system 20 then captures images of the birds 10, and analyzes the images to determine the bird's initial configuration (one of the four combinations of position and orientation imparted by the chute).

The machine vision system 20 utilizes the initial configuration of the bird, and compares it to the preset final configuration desired (in one embodiment, breast-up position, feet last orientation). It then controls an orientation system 30 and a position system 40 to re-configure (if necessary) the bird from its initial configuration to the final configuration.

The orientation system 30 can comprise a rotating device to rotate the birds from the initial orientation to the final orientation. If the initial and final orientations of the bird are the same, the orientation system 30 will not activate to rotate the bird. But, for example, if the bird is presented to the configuration subsystem 100 in a feet first orientation, and prior to pushing the bird into the transfer box, the bird should be in a feet last orientation, the orientation system 30 will rotate the bird through approximately 180 degrees.

The orientation system 30 can incorporate an anti-movement system to prevent the carcasses from spinning or flipping or coming off of the rotating device when the rotating device rotates. In a preferred embodiment, this anti-movement system is a "V" shaped floor of the rotating device designed to receive carcasses.

The position system 40 can comprise a flipping device to flip the birds from the initial position to the final position. If the initial and final positions of the bird are the same, the position system 40 will not activate to flip the bird. But, for example, if the bird is presented to the configuration subsystem 100 in a breast-down position, and prior to pushing the bird into the transfer box, the bird should be in a breast-up position, the position system 40 will flip the bird through approximately 180 degrees.

It will be understood by those of skill in the art that the configuration subsystem 100 need not have linear stations, nor separate orientation and position systems 30, 40. The various stations can be stacked and otherwise configured differently than shown in FIG. 1, which shows a relatively horizontal assortment of stations. Further, the position system can act prior to the orientation system, or the orientation and position systems 30, 40 can comprise a single station that orderly or simultaneously rotates and flips (if one or both are needed) the birds from the initial configuration to the final configuration.

Figure 2:
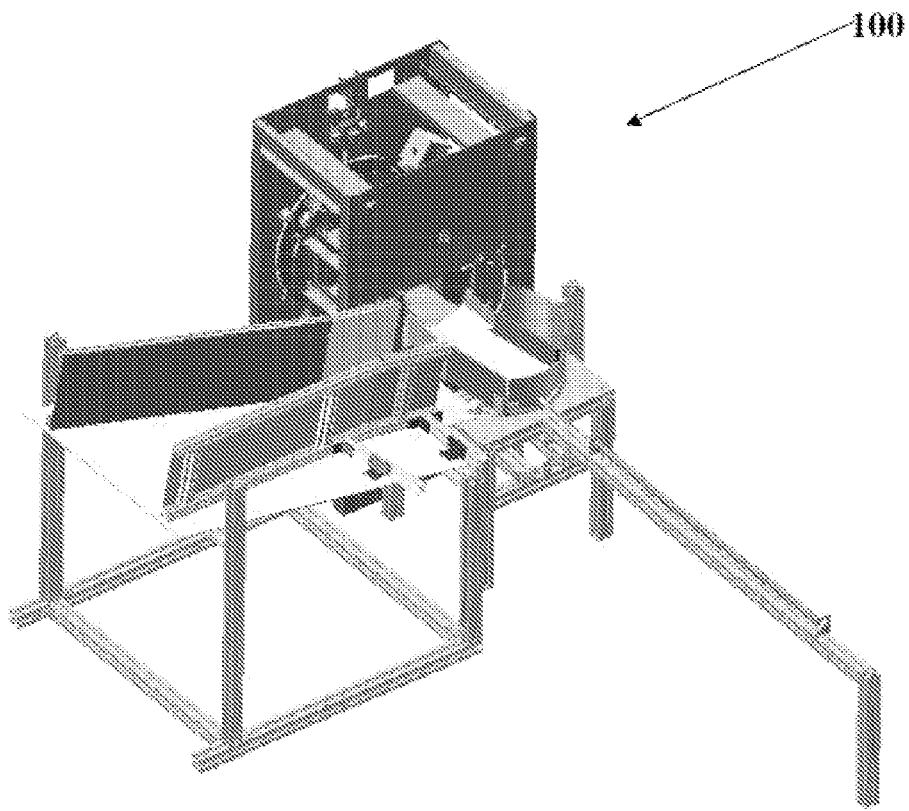
FIGS. 2 and 3 illustrate perspective and top views, respectively, of the present configuration subsystem according to another preferred embodiment of the present invention.
Figure 3:
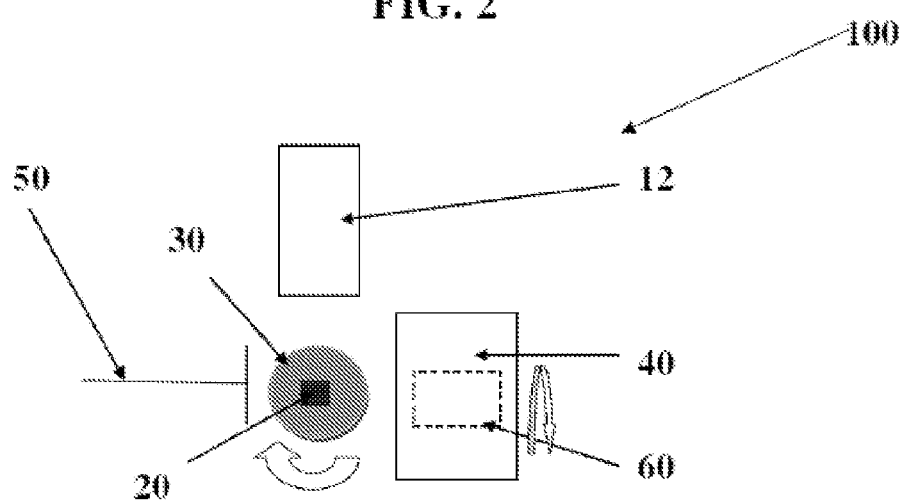

FIGS. 2 and 3 illustrate another exemplary embodiment of the configuration subsystem 100. The configuration subsystem 100 of FIGS. 2 and 3 comprises the chute 12, machine vision system 20, orientation system 30, position system 40, and pusher 50. The chute 12 places the birds into one of the four preferred initial configurations, and the systems 20, 30 and 40 are used to place the bird into the final configuration. The pusher 50 is used to push the properly orientated bird into the position system 40. It was found to be easier to push a bird feet first, than feet last, thus in this embodiment, it is preferred to rotate the bird into a feet first orientation, then push on the base of the neck (where the head/neck used to be attached), to place the bird into the position system 40.

Figure 4:
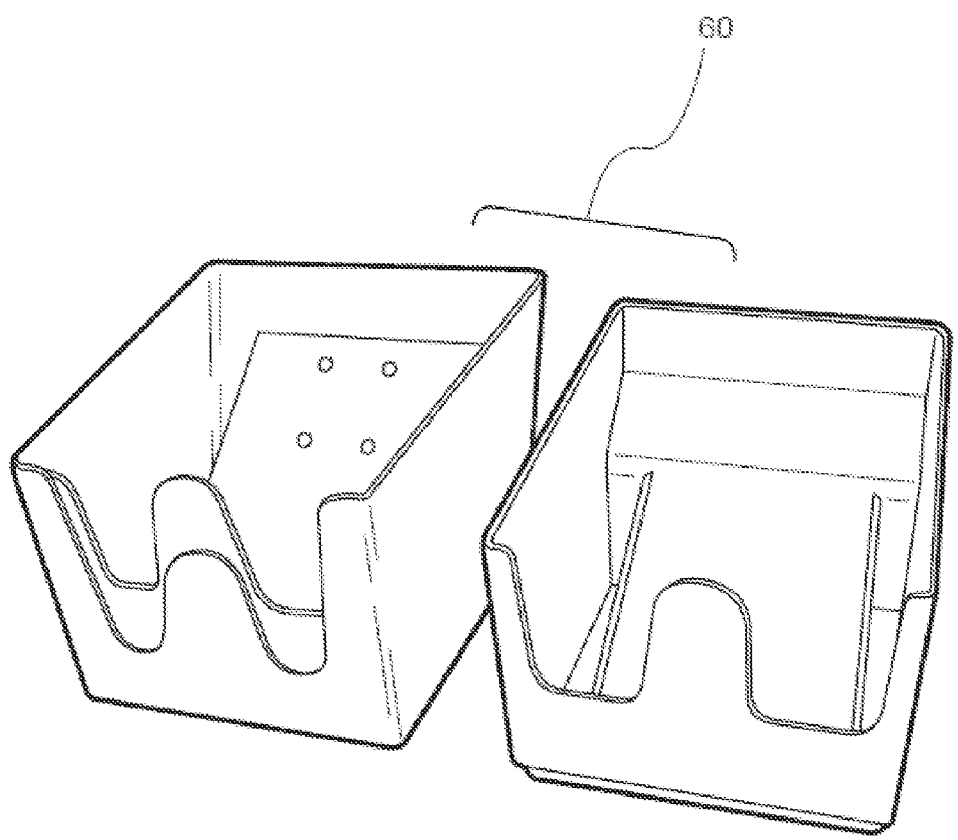
FIG. 4 illustrates two perspective views (steel and plastic) of the transfer box according to a preferred embodiment of the present invention.
Figure 5A:
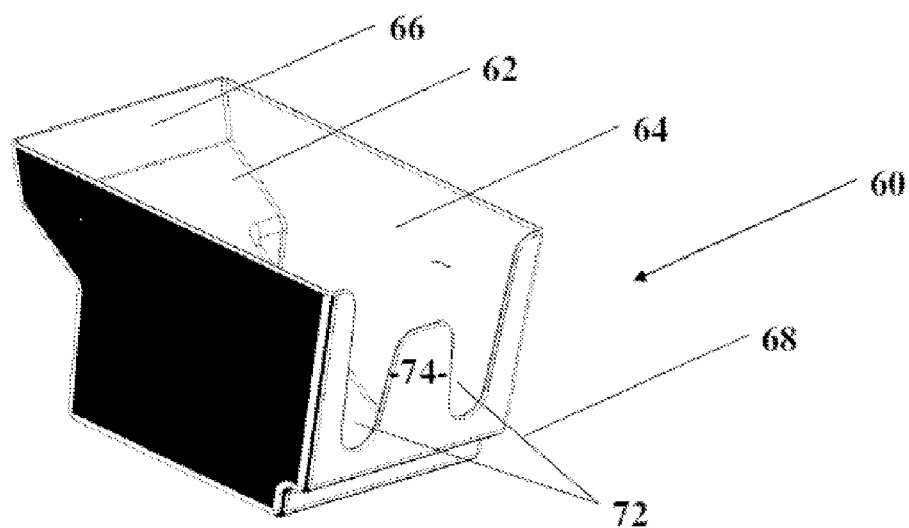
FIGS. 5(a) and 5(b) illustrate top and bottom perspective views of another transfer box according to a preferred embodiment of the present invention.
Figure 5B:
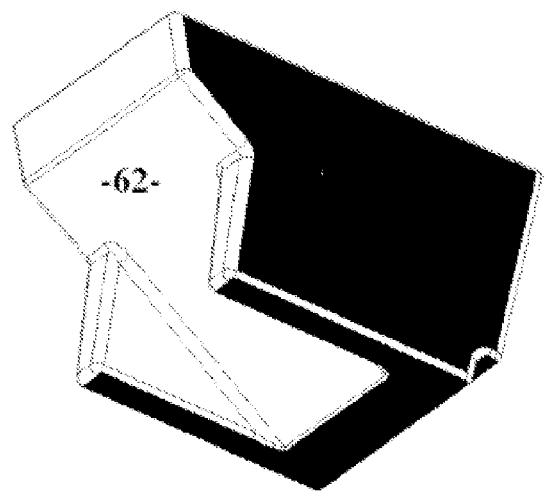

The second preferred subsystem of the present invention comprises a specifically designed transfer box 60 used to consistently deliver different sized, shaped, textured and weighted items (in the same final configuration), to a process line. Upon bird placement into the final configuration, the bird is placed into a transfer box 60, shown in FIGS. 4-5. The transfer box 60 is designed to present a bird to the shackle line in a manner such that the spacing and extension of the legs will compliment the moving shackle. Even if each bird is in the final configuration, as each bird has its own size, shape, texture and weight (and thus center of gravity), the transfer box must be capable of presenting each different bird in such a way that the shackle can consistently and repeatedly interact with the legs and hocks, enabling all birds to smoothly exit the transfer box 60.

A preferred transfer box comprises an inclined base 62 with upwardly extending side 64 and end walls 66. The end wall in proximity of the legs, the legs end wall 68, is provided with two apertures 72 through which the legs can extend outside the box. The inclined base 62 is designed such that the bird is inclined downward, and thus tends to be pulled downward at an angle via gravity, toward the legs end wall, to maintain the legs outside the transfer box. Between the leg apertures, a legs separation obstacle 74 is provided, to ensure the legs remain sufficiently separated during the transfer process so smooth transfer of the bird from the transfer box to the shackle line can be had. Additionally, the transfer box may contain holes to allow liquid, in most situations, water, to pass through the box in order to chill the carcasses.

Figure 6:
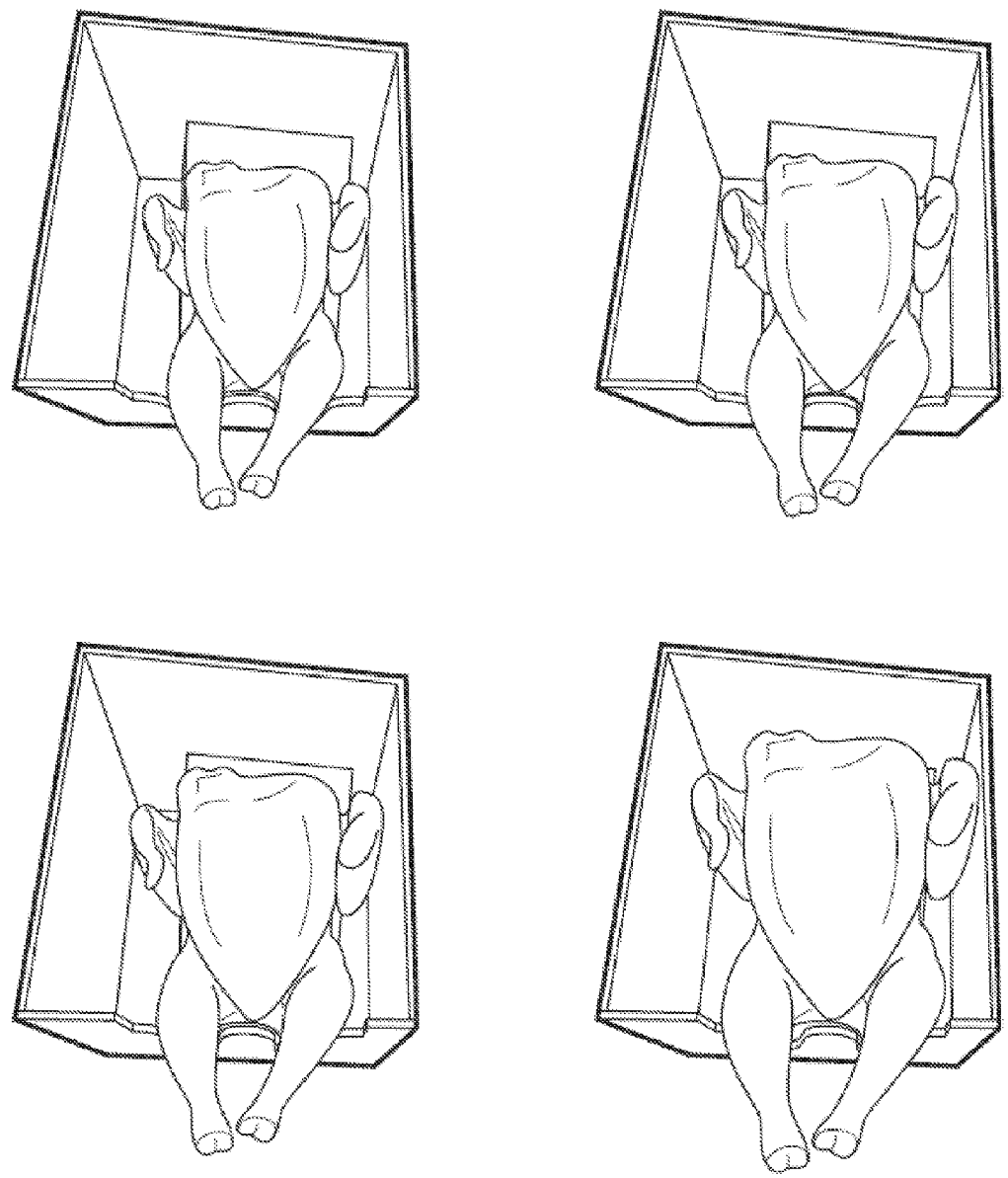
FIG. 6 illustrates various poultry positions with different transfer box designs.

FIG. 6 illustrates various leg positions of poultry in the transfer box 60 with different sizing and spacing of the apertures 72 and legs separation obstacle 74.

The present transfer box design is important for several reasons. First, the conventional method of transferring birds is the shackle line (where the birds hang by the legs). Other than that, the bird is randomly located on a conveyor or in a chiller. The present transfer box allows for transportation between processes without losing control of the bird. This is important to automating these tasks. If one has to continually solve the random bin-picking problem, then one cannot cost-effectively automate these tasks. The present transfer box solves many critical problems for transporting the bird in a processing plant. The beneficial attributes of the present transfer box include:

1. It is designed to separate the legs so that they can be grabbed with the shackle line (which has a fixed distance between the shackles);
2. The transfer box is designed to push the bird forward so that the knuckle is consistently located relative to the end of the box. Again, this is to allow the shackle line to grab the bird by the knuckle.
3. The transfer box can include a counter-balance system that keeps the box level (if desired) even while the transfer mechanism changes direction.
4. The transfer box can include holes to allow for water to pass through it so that the bird can continue to chill in a water bath while in the box; and
5. The transfer box is designed for food safety. The material and the design are suitable for the production environment.

Figure 7:
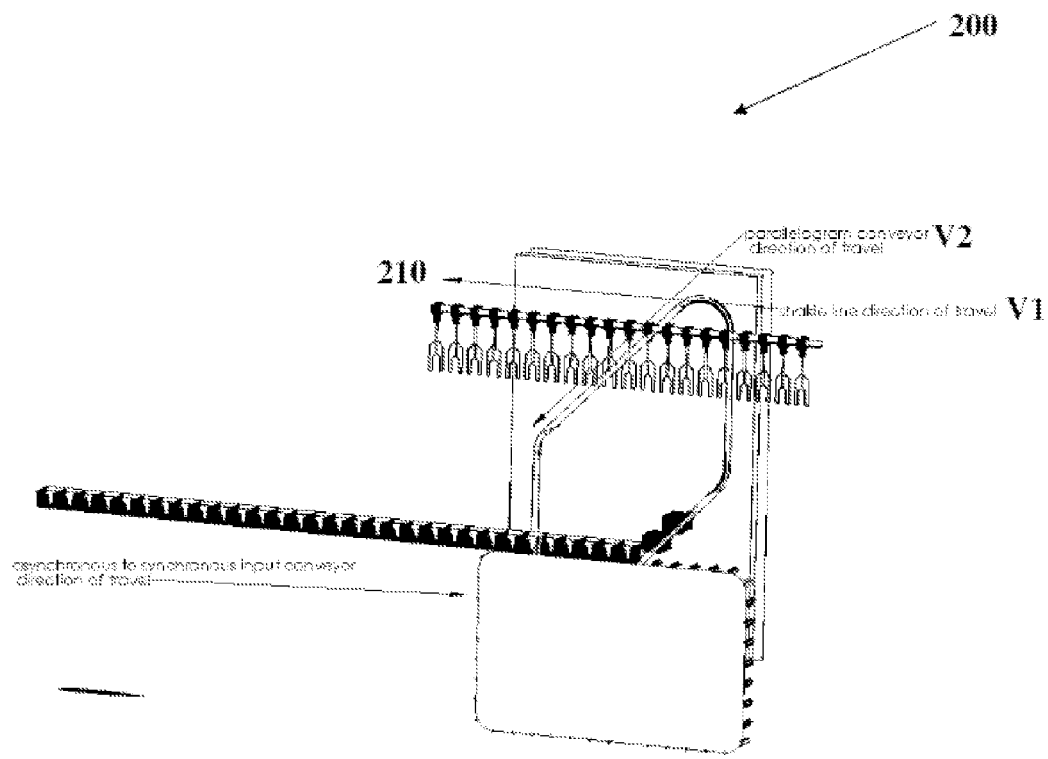
FIGS. 7 and 8 illustrate views of the present transfer process according to a preferred embodiment of the present invention.
Figure 8:
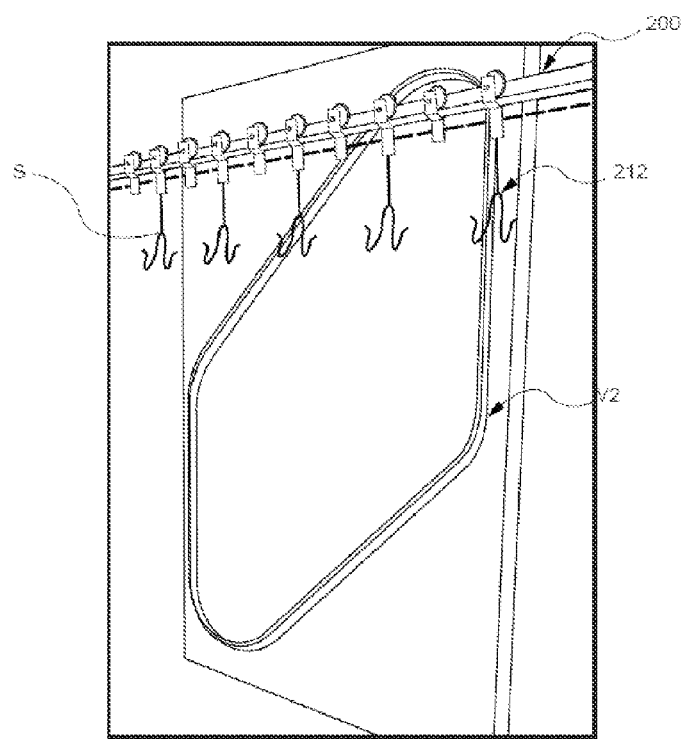

The third preferred subsystem of the present invention comprises a transfer process 200 enabling an item in the transfer box 60 moving at one vector V1, to smoothly transfer the item in the transfer box 60 to a process line 210 moving in a different vector V2. As shown in FIGS. 7-8, in a preferred embodiment, the third subsystem comprises a transfer process 200 enabling a bird held in the transfer box 60 to be hung onto a shackle line 212, the transfer box 60 and shackle line 212 interacting at the point of bird transfer. As the transfer box 60 moves in proximity to the shackle line 212, a shackle S grabs one or both legs of the bird, and the bird is lifted out of the transfer box 60 as the distance between transfer box 60 and shackle line 212 increases. Again, this distance can increase as the transfer box moves along a vertical path away from a horizontal path of a shackle line, or vice versa, or each path can have a component of vertical and horizontal movement. It is the relative separation of the two paths that is important.

The shackle S used to remove the bird from the transfer box 60 can have members designed to engage the bird's legs and hocks. In an exemplary embodiment, the shackle has a space between members to engage the bird's legs and hocks, and thereby grab the bird as the shackle S and the transfer box 60 move apart.

To lift the bird from the transfer box 60, the shackle S generally embodies two motions. A first motion inserts the principal bar between the two legs, and a second is to have the transfer box and shackle line move relatively away from one another. In an exemplary embodiment, the shackle line is generally horizontal, while the transfer path of the transfer box moves up and through the shackle line (but no contact is made between box/bird/shackle), and then down and through the shackle line again, but on this down pass, the shackle and bird make contact, and the bird is transferred to the shackle.

In one exemplary embodiment, the shackle line is generally horizontal (with the shackles moving in a generally horizontal direction), and the transfer box is guided through a generally-parallelogram shape to interact with the shackle line. A loaded transfer box travels along a conveyor belt in a generally horizontal direction, is picked up by a transfer conveyor to travel in the generally parallelogram shape, taking it from the conveyor belt, into contact with the shackle line. The bird is shackled, and the now unloaded transfer box returned to the conveyor belt via the parallelogram shaped path.

Figure 9:
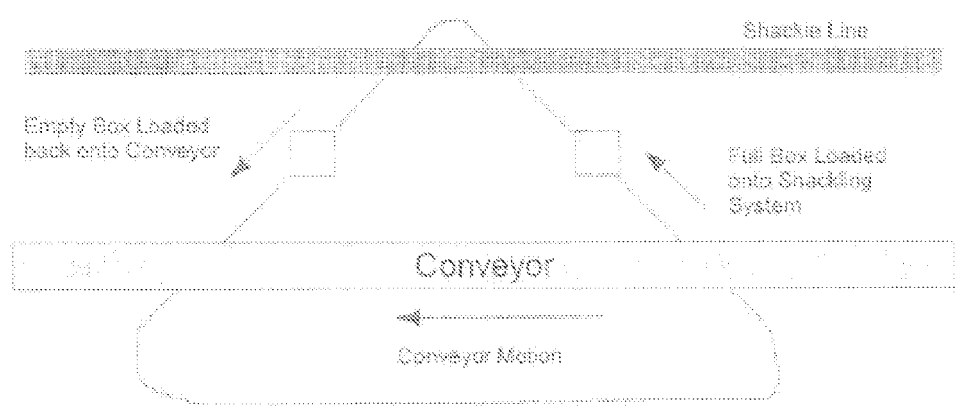
FIG. 9 illustrates a transfer box process line (transfer conveyor) that is triangular in shape

In another exemplary embodiment, the transfer box process line is triangular in shape (FIG. 9). With a triangular movement, the distance the transfer box moves through along the transfer box process line is shorter than one traced through a parallelogram, so the cycle time with such a set up can be shorter.

Unlike a robotic solution where one would try to pick the bird up and place it onto the moving shackle line (as discussed, too slow, and too difficult with non-rigid items), the present transfer process can in a preferred embodiment use two synchronized conveyors to place the bird on the shackle line. The horizontal velocity of the transfer box is the same as the shackle line, but it is also moving vertically as well (thus, the motion of the transfer box is at an angle). Another function of this inclined conveyor is that it is possible to place the transfer boxes on the conveyor, and remove them from the conveyor automatically as well. The triangular shaped transfer path provides this well. In this case, on the up slope of the transfer box process path, the transfer box is lifted off the conveyor onto the transfer path. On the down slope of the transfer path, the bird is transferred to the shackle line. Then, further down, the transfer box is placed back onto the same conveyor that it was removed earlier. In this manner, a relatively simple method of removing and then returning the empty boxes onto the conveyor is presented.

Figure 10:
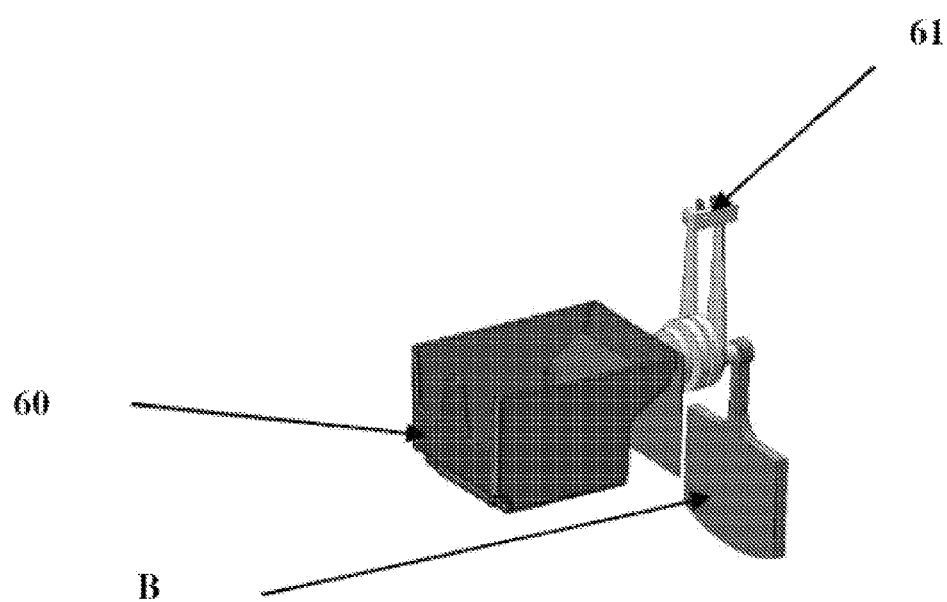
FIG. 10 illustrates a transfer box with a ballast and chain fixation element according to a preferred embodiment of the present invention.

FIG. 10 illustrates a transfer box 60 including a counter-balance system (ballast B) for control of the handoff between transfer box and shackle line, so a loaded and empty box do not overly shift. Further, the box 60 can connect to the transfer box process line via a chain fixation element 61.

Figure 11:
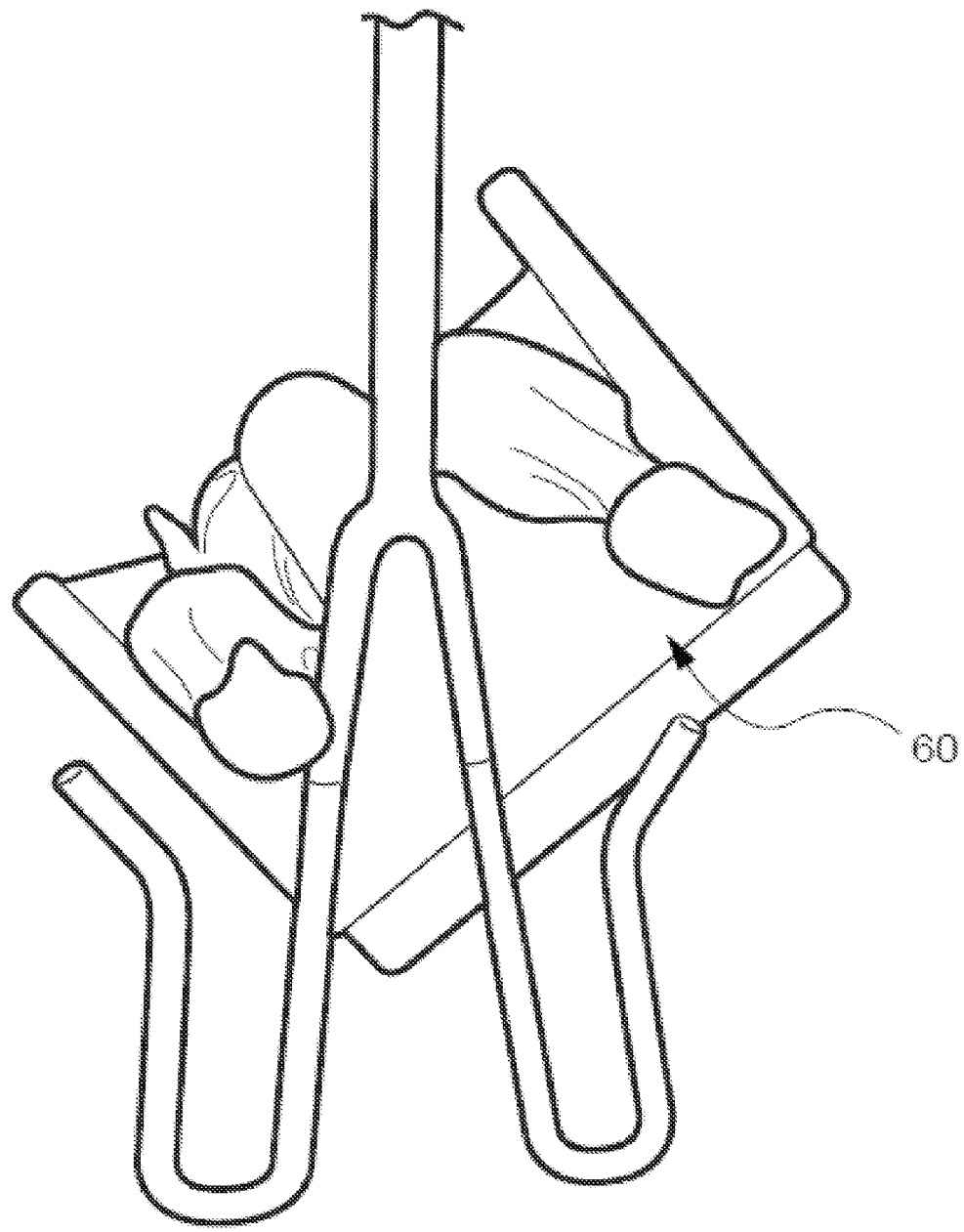
FIG. 11 illustrates one presentment configuration of the transfer box to the shackle line according to a preferred embodiment of the present invention.

FIG. 11 illustrates one presentment configuration of the transfer box 60 to the shackle line, wherein the box is angled in order to provide a smooth transition when the shackle interacts with the bird.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A method of poultry processing comprising:
supplying poultry products;
transferring uniformly configured poultry products into a transfer box moving along a transfer box process path, wherein the transfer box comprises:
an inclined base;
upwardly extending side walls and a first end wall; and
an upwardly extending second end wall;
wherein the second end wall is provided with two apertures and a separation obstacle therebetween, the inclined base inclined downwardly toward the second end wall, wherein upon receiving a poultry product to transfer, the poultry product is gravity fed toward the second end wall, wherein a leg of the poultry product extends through an aperture; and
transferring the poultry product from the transfer box to a processing line moving along a processing line path.

2. The method of claim 1, wherein transferring the poultry product from the transfer box to a processing line moving along a processing line path comprises bringing the transfer box process path in proximity to the processing line path at least once, for handoff of the poultry product in the transfer box to the processing line.

3. The method of claim 1, wherein the transfer box further comprises a counter-balance system to keep the transfer box level as it travels along the transfer box process path.

4. The method of claim 1, further comprising returning the empty transfer boxes to the transfer box process path.

5. The method of claim 1, wherein the transfer box process path is in the shape of a triangle, wherein one side of the transfer box process path lifts the full transfer box from the transfer box process path, and into proximity to the processing line path, and another side of the transfer box process path returns the empty transfer box to the transfer box process path.

6. The method of claim 1, wherein the transfer box process path is in the shape of a parallelogram, wherein one side of the transfer box process path lifts the full transfer box from the transfer box process path, and into proximity to the processing line path, and another side of the transfer box process path returns the empty transfer box to the transfer box process path.

7. A method of poultry processing comprising:
supplying poultry products exiting a chiller;
transferring uniformly configured poultry products into a transfer box moving along a transfer box process path, the transfer box comprising an inclined base, upwardly extending side walls and a first end wall, and an upwardly extending second end wall, wherein the second end wall is provided with two apertures and a separation obstacle therebetween, the inclined base inclined downwardly toward the second end wall, wherein upon receiving a poultry product to transfer, the poultry product is gravity fed toward the second end wall, wherein a leg of the poultry product extends through an aperture; and transferring the poultry product from the transfer box to a shackle moving along a shackle line path by bringing the transfer box process path in proximity to the shackle line path at least once, for handoff of the poultry product in the transfer box to the shackle.

8. The method of claim 7, wherein the transfer box further comprises a counter-balance system to keep the transfer box level as it travels along the transfer box process path.

9. The method of claim 7, further comprising returning the empty transfer boxes to the transfer box process path.

10. The method of claim 7, wherein the transfer box process path is in the shape of a triangle, wherein one side of the transfer box process path lifts the full transfer box from the transfer box process path, and into proximity to the shackle line, and another side of the transfer box process path returns the empty transfer box to the transfer box process path.

11. The method of claim 7, wherein the transfer box process path is in the shape of a parallelogram, wherein one side of the transfer box process path lifts the full transfer box from the transfer box process path, and into proximity to the shackle line, and another side of the transfer box process path returns the empty transfer box to the transfer box process path.

12. A method of poultry processing comprising:
supplying poultry products exiting a chiller;
transferring the poultry products one each into a transfer box moving along a conveyor, the transfer box comprising an inclined base, upwardly extending side walls and a first end wall, and an upwardly extending second end wall, wherein the second end wall is provided with two apertures and a separation obstacle therebetween, the inclined base inclined downwardly toward the second end wall, wherein upon receiving a poultry product to transfer, the poultry product is gravity fed toward the second end wall, wherein a leg of the poultry product extends through an aperture;
transferring transfer boxes with poultry products to a transfer box process path;
providing a shackle line with moving shackles; and
transferring the poultry product from the transfer box to a shackle bringing the transfer box process path in proximity to the shackle line path at least once, for handoff of the poultry product in the transfer box to the shackle.

13. The method of claim 12, further comprising returning the empty transfer boxes to the conveyor.

14. The method of claim 13, wherein the transfer box process path is in the shape of a triangle, wherein one side of the transfer box process path lifts the full transfer box from the conveyor, and into proximity to the shackle line, and another side of the transfer box process path returns the empty transfer box to the conveyor.

15. The method of claim 13, wherein the transfer box process path is in the shape of a parallelogram, wherein one side of the transfer box process path lifts the full transfer box from the conveyor, and into proximity to the shackle line, and another side of the transfer box process path returns the empty transfer box to the conveyor.

16. The method of claim 12, wherein the transfer box further comprises a counter-balance system to keep the transfer box level as it travels along the transfer box process path.

* * * * *